(12) United States Patent
Reimann et al.

(10) Patent No.: US 9,307,319 B2
(45) Date of Patent: Apr. 5, 2016

(54) SENSOR CIRCUIT AND CALIBRATION METHOD

(71) Applicant: NXP B.V., Eindhoven (NL)

(72) Inventors: Klaus Reimann, Eindhoven (NL); Twan van Lippen, Bladel (NL); Remco Henricus Wilhelmus Pijnenburg, Hoogeloon (NL); Iris Bominaar-Silkens, Valkenswaard (NL); Robert Hendrikus Margaretha van Veldhoven, Dommelen (NL)

(73) Assignee: NXP, B.V., Eindhoven (NL)

( * ) Notice: Subject to any disclaimer, the term of this patent is extended or adjusted under 35 U.S.C. 154(b) by 455 days.

(21) Appl. No.: 13/860,164

(22) Filed: Apr. 10, 2013

(65) Prior Publication Data

US 2013/0279717 A1    Oct. 24, 2013

(30) Foreign Application Priority Data

Apr. 18, 2012   (EP) ..................................... 12164636

(51) Int. Cl.
*H04R 3/02* (2006.01)
*G01L 9/12* (2006.01)
*G01P 15/125* (2006.01)
*G01D 5/24* (2006.01)

(52) U.S. Cl.
CPC .. *H04R 3/02* (2013.01); *G01D 5/24* (2013.01); *G01L 9/12* (2013.01); *G01P 15/125* (2013.01)

(58) Field of Classification Search
CPC ........ H04R 3/02; H04R 3/007; H04R 19/016; G01D 5/24; G01P 15/125; G01L 9/12
USPC .................. 381/174, 113, 83, 73, 93, 94.2, 95
See application file for complete search history.

(56) References Cited

U.S. PATENT DOCUMENTS

| | | | |
|---|---|---|---|
| 6,450,031 B1 | 9/2002 | Sakai et al. | |
| 6,731,121 B1* | 5/2004 | Hsu | G01D 5/24 324/678 |
| 6,970,126 B1 | 11/2005 | O'Dowd et al. | |
| 8,831,246 B2* | 9/2014 | Josefsson | H04R 3/00 381/107 |
| 2003/0025983 A1 | 2/2003 | Lasalandra et al. | |
| 2008/0106275 A1* | 5/2008 | Seppa | G01L 9/12 324/680 |
| 2012/0013351 A1* | 1/2012 | Daniel | G01D 5/24 324/602 |
| 2012/0057721 A1* | 3/2012 | Arias-Drake | H04R 19/016 381/94.2 |

FOREIGN PATENT DOCUMENTS

DE          100 36 106 A1    3/2001
DE     10 2009 000950 A1    8/2010

(Continued)

OTHER PUBLICATIONS

Cheng, "Design of a readout scheme for a MEMS microphone", 2009.*
Lei, S., et al; "Oversampled Capacitance-to-Voltage Converter IC with Application to SiC MEMS Resonator"; Proceedings of IEEE Sensors 2003, vol. 2; pp. 882-887 (Oct. 2003).
Lemkin, M. et al. "A Three-Axis Micromachined Accelerometer with a CMOS Position-Sense Interface and Digital Offset-Trim Electronics", IEEE J. of Solid-State Circuits, vol. 34, No. 4, pp. 456-468 (Apr. 1999).

(Continued)

*Primary Examiner* — Vivian Chin
*Assistant Examiner* — David Ton

(57) ABSTRACT

A read out circuit for a sensor uses a feedback loop to bias the sensor to a desired operating point, such as the maximal possible sensitivity, but without the problem of an instable sensor position as known for the conventional read-out with constant charge. The reference bias to which the circuit is controlled is also varied using feedback control, but with a slower response than the main bias control feedback loop.

15 Claims, 10 Drawing Sheets

$f_{res} < 1/(2\pi R1(C1+C2+C5)) < f_{clk}$

(56) References Cited

FOREIGN PATENT DOCUMENTS

| | | |
|---|---|---|
| EP | 1 278 068 A2 | 1/2003 |
| EP | 1 790 988 A1 | 5/2007 |
| FR | 2 706 038 A1 | 12/1994 |
| JP | 2005-315805 A | 11/2005 |
| WO | 00/02110 A2 | 1/2000 |
| WO | 01/31351 A | 5/2001 |
| WO | 2005/068959 A2 | 7/2005 |
| WO | 2006/040403 A1 | 4/2006 |
| WO | 2010/033078 A1 | 3/2010 |
| WO | 2010/131640 A1 | 11/2010 |

OTHER PUBLICATIONS

Handtmann, M. et al. "Sensitivity Enhancement of MEMS Inertial Sensors Using Negative Springs and Active Control", Sensors and Actuators A 97-98, pp. 153-160 (2002).

Woestyn, P. et al., "A Dual-Mass Capacitive-Readout Accelerometer Operated Near Pull-In", 53rd IEEE Int'l. Midwest Symp. on Circuits and Systems, pp. 1185-1188 (Aug. 2010).

Extended European Search Report for European Patent Appln. No. 12164636.8 (Oct. 12, 2012).

\* cited by examiner $1/(2\pi R1(C1+C2+C5)) < f_{clk}$

SENSOR CIRCUIT AND CALIBRATION METHOD

CROSS-REFERENCE TO RELATED APPLICATIONS

This application claims the priority under 35 U.S.C. §119 of European patent application no. 12164636.8, filed on Apr. 18, 2012, the contents of which are incorporated by reference herein.

This invention relates to MEMS capacitive sensors, for example for use as microphones.

BACKGROUND OF THE INVENTION

Capacitive microphones consist of two membranes: a membrane that is actuated by the sound pressure and a perforated membrane which forms a counter-electrode ("backplate") that does not move in response to sound pressure, as the perforations render it acoustically transparent. The perforations allow the first membrane to move without pressure build-up in the volume between membrane and backplate.

FIG. 1 shows a top-view and cross-section through a (MEMS) condenser microphone.

The Si substrate 1 has an opening which exposes a part of the movable membrane 3 which is sensitive to acoustic pressure. The movable membrane is formed over an (optional) insulator 2. The backplate 5 (a fixed membrane) is suspended over a further insulator 4 and is perforated with a regular pattern of holes. The electrode connections 6,7 are to the two membranes and are used to measure the capacitance.

The intrinsic noise of a capacitance sensor can be made fairly small due to low mechanical losses and well-controlled processing and optimized design, so that the read out circuitry (typically CMOS circuitry) dominates the noise. A problem that remains is the small sensitivity of most MEMS devices under a constant-charge bias arrangement. This bias arrangement is typically used for MEMS microphones due to low power consumption and a stable operation point of the MEMS sensor.

The noise of the CMOS read-out circuitry becomes less important if the MEMS signal is strong. However, this is only possible at high voltages or close to the instable pull-in point of the sensor. The sensitivity is highest at this instable pull-in point. In fact, the sensitivity becomes infinite in the DC limit. The noise of the CMOS input stage then becomes less important.

A fast feedback control system can stabilize the movable part of the MEMS sensor at any point, including the instable point if the feedback bandwidth is considerably larger than the resonance frequency.

WO 2006/040403 discloses a feedback system for a MEMS sensor, which operates closes to the pull-in point. FIG. 2 shows the feedback circuit of WO2006/040403.

The circuit comprises a capacitive bridge 104,105,106,107 including the sensor capacitance 105. The capacitive bridge is regulated via a feedback loop and a bias resistor 103 such that it is at a constant operating point. With capacitor 107, the operating point can be set such that the membrane position is at the pull-in point. The feedback bias signal is the read-out signal. It is still non-linear, as the force-voltage relation is quadratic, but the signal is fairly linear for small signals.

The circuit has a regulator 101 which feeds an operational amplifier 102. The regulator 101 has a DC input supplied from a phase sensitive detector 101, which compares the bridge sensor signal (amplified by amplifiers 108,109) with a reference AC signal using a phase mixer 110.

The operation of the circuit is described in detail in WO 2006/040403.

In the ideal case, the gain of the sensor becomes infinite at the instable point. The total sensitivity is then only set by the feedback loop. The noise of the loop becomes insignificant because of the high gain of the low noise sensor.

Digital $\Sigma$-$\Delta$ (Sigma-Delta) feedback-loops are also known for MEMS sensors.

The known feedback loops however have some disadvantages:

- a higher power consumption may result than for a DC readout.
- the sensitivity (or sensor gain) is not infinite, even at the pull-in instable point since the mass acts as a dynamic spring constant. This leads to a frequency dependence of the transfer function.
- the feedback loop may become unstable. In large microphone membranes for example, higher order modes exist. If they are excited by strong acoustic signals, then it is questionable if the feedback loop can suppress oscillation, because it is only designed for the fundamental deflection mode.
- the optimum bias point can drift, e.g., due to temperature or ageing. It can also dynamically move with the feedback bias voltage as the electrostatic spring softening depends on the bias voltage. The feedback-loop of FIG. 2 only keeps the capacitance constant, i.e. the mechanical spring constant but not the bias voltage. The acoustic pressure can influence the mechanical properties. The electrostatic pressure and the acoustic pressure have different profiles so that effectively the membrane will deform even if the capacitance or the mean deflection is kept constant. The optimum point will therefore shift in response to a large input signal.
- the process spread is not compensated. This requires tuning during testing or self-calibration.

Thus, a need exists for better signal to noise ratios of MEMS capacitive sensors such as microphones, but also other pressure sensors, accelerometers, gyroscopes, etc. The intrinsic noise of a capacitance sensor can be made fairly small due to low mechanical losses and well-controlled processing and optimized design, so that the CMOS-read-out dominates the noise. MEMS capacitive sensors have small capacitances due to their small size. This means that the input stage of the read-out circuit needs a low capacitance. Unfortunately, the input noise of a CMOS read-out circuit increases when the input capacitance becomes smaller. New technologies do not improve this CMOS noise significantly. Options like bipolar JFET devices and cooling are more expensive in cost or power.

SUMMARY OF THE INVENTION

According to the invention, there is provided a circuit and method as claimed in the independent claims.

In one aspect, the invention provides a sensor circuit comprising:
an AC signal source for generating a bias signal;
an amplifier;
a sensor having an impedance which is sensitive to a physical property to be sensed, coupled between the signal source and the amplifier;
a tuneable impedance element connected to the sensor;
a feedback loop arrangement around the amplifier for controlling a bias applied to the sensor element, wherein the feedback loop arrangement comprises:

a first feedback control path for setting a bias level to a reference bias level; and a second feedback control path for setting the reference bias level, wherein the first feedback control is faster than the second feedback control.

The invention provides a read out circuit for a sensor in which a feedback loop biases the sensor to a desired operating point, such as the maximal possible sensitivity, but without the problem of an instable sensor position as known for the conventional read-out with constant charge. The reference bias to which the circuit is controlled is also varied using feedback control, but with a slower response than the main bias control feedback loop. Thus, a first feedback control controls a bias point to match a reference bias point, for example by constraining the sensor impedance to match a reference impedance (such as a capacitance), and a second feedback control varies the reference bias point, for example by varying the reference impedance.

In this way, an adaptive bias can react within the full audio frequency range so that wind-noise and other sources do not de-sensitize the sensor.

In one arrangement, the AC signal source is a first AC signal source for generating a first bias signal, and the circuit further comprises:

a second AC signal source for generating a second bias signal with opposite phase to the first bias signal;

wherein the amplifier has first and second inputs;

wherein the sensor is coupled between one of the first and second signal sources and the first input to the amplifier;

wherein the tuneable element is coupled between the other of the first and second signal sources and the first input to the amplifier.

This arrangement means that the AC component of the bias signal is cancelled and is not amplified by the amplifier.

The first input can comprises the inverting input of the amplifier and the first feedback control path can comprise a feedback impedance from the output to the inverting input of the amplifier.

This adjusts the bias of the sensor until the sensor impedance matches the tuneable element impedance.

The amplifier can comprise a differential amplifier with an inverting and a non-inverting input and a pair of differential outputs, wherein a second impedance element is coupled between the one of the first and second signal sources and the second input to the amplifier and a third impedance element is coupled between the other of the first and second signal sources and the second input to the amplifier. This defines a differential implementation.

The first feedback control path can comprise a first feedback impedance from one of the differential outputs to the inverting input of the amplifier and a second feedback impedance from the other of the differential outputs to the non-inverting input of the amplifier.

The tuneable element can comprise a tuneable capacitor. This is suitable for sensors providing variable capacitance, such as microphones. The tuneable element can instead comprise a capacitor connected to a clock driver having a tuneable phase and/or amplitude. The clock driver and the fixed capacitor together can be considered to implement a tuneable capacitor function.

The second feedback control path can provide the control signal for the tuneable element. Thus, the control of the tuneable element provides the slower adaptation of the biasing point. This can track the point of greatest sensitivity of the sensor, which thus implements a critical point tracking function.

The second feedback control path can comprise an analogue to digital converter and a digital signal processing arrangement for generating a tuning signal.

In another aspect, the invention provides a method of calibrating a sensor circuit which comprises an AC signal source for generating a bias signal, an amplifier, a sensor having an impedance which is sensitive to a physical property to be sensed, coupled between the signal source and the amplifier and a tuneable element connected to the sensor, wherein the method comprises:

controlling a bias applied to the sensor element using a first feedback control path for setting a bias level to a reference bias level and a second feedback control path for setting the reference bias level, wherein the first feedback control is faster than the second feedback control.

BRIEF DESCRIPTION OF THE DRAWINGS

Examples of the invention will now be described with reference to the accompanying drawings, in which.

DETAILED DESCRIPTION OF THE EMBODIMENTS

The invention provides a sensor circuit using an AC signal source for generating a bias signal. A sensor has an impedance which is sensitive to a physical property to be sensed, coupled between the signal source and an amplifier. A feedback loop arrangement around the amplifier controls a bias applied to the sensor element, wherein the feedback loop arrangement comprises: a first feedback control path for setting a bias level to a reference bias level and a second feedback control path for setting the reference bias level, wherein the first feedback control is faster than the second feedback control. This two-level feedback system enables the bias point to be set to a reference value quickly, to provide stable operation but also enables the reference point to be adapted, so that the reference point can be closer to the limit of stability for example.

The noise level is lowered by increasing the electromechanical gain of a sensor. This is achieved by biasing near to the optimum bias voltage, corresponding to the instable pull-in point.

It is noted that the approach of biasing near to a static optimum bias is conceptually known from WO2006/040403.

Figure 3:
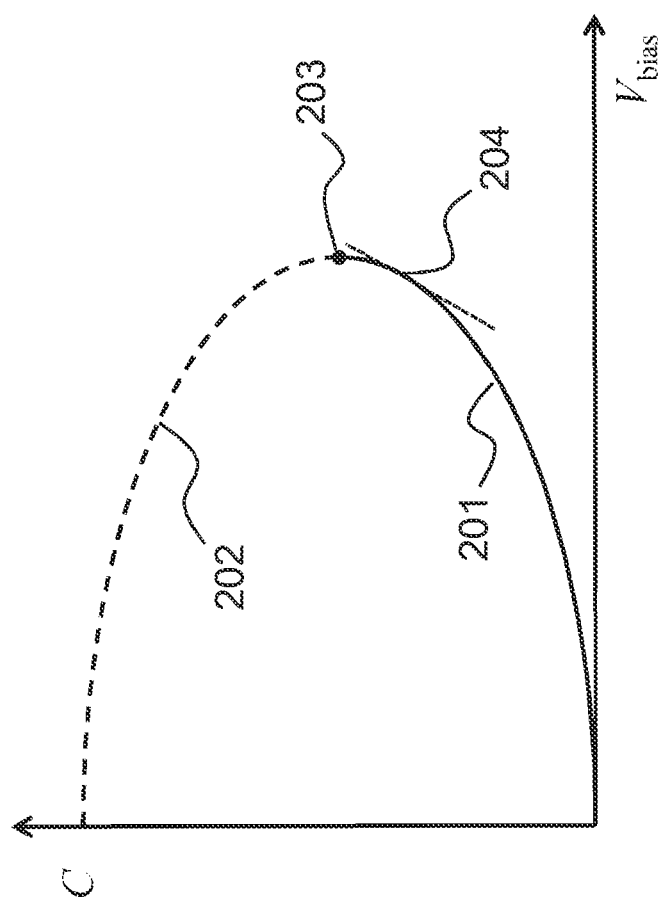
FIG. 3 shows how the sensitivity of a MEMS capacitive sensor varies with bias point.

FIG. 3 shows the capacitance as a function of bias voltage. The branch 201 of the plot represents the point to which the sensor can be biased. The instable branch 202 can only be reached by feedback stabilization.

The sensitivity can be estimated from the derivative 204 of the capacitance as function of bias voltage. The bias voltage exerts an electrostatic pressure, similar to a mechanical pressure. The capacitance change in response to voltage is therefore similar to the capacitance change as function of mechanical pressure. The sensitivity becomes maximal at the instable point 203.

Figure 1:
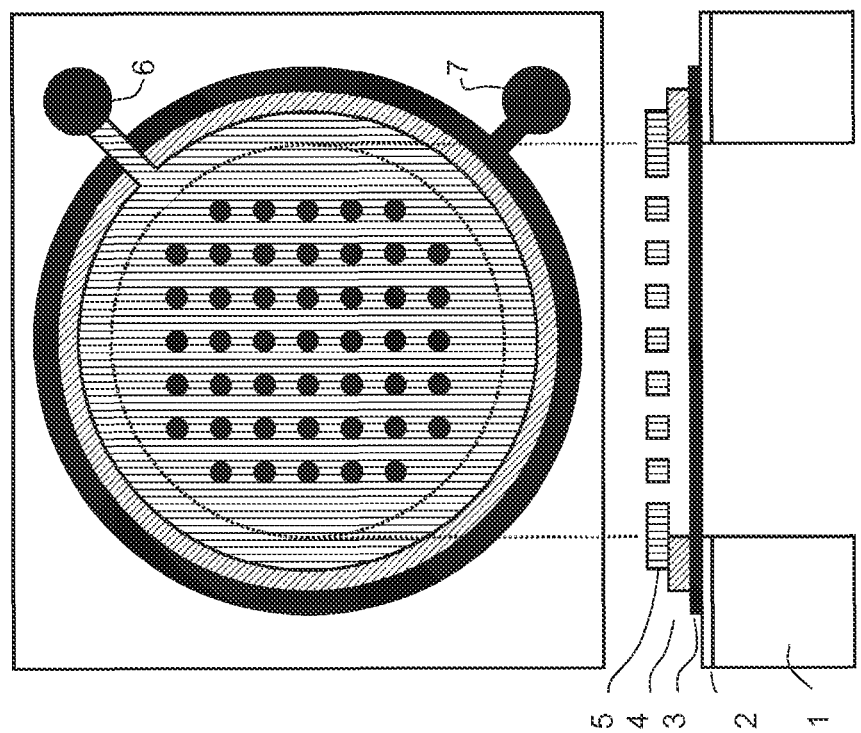
FIG. 1 shows a known microphone design.
Figure 2:
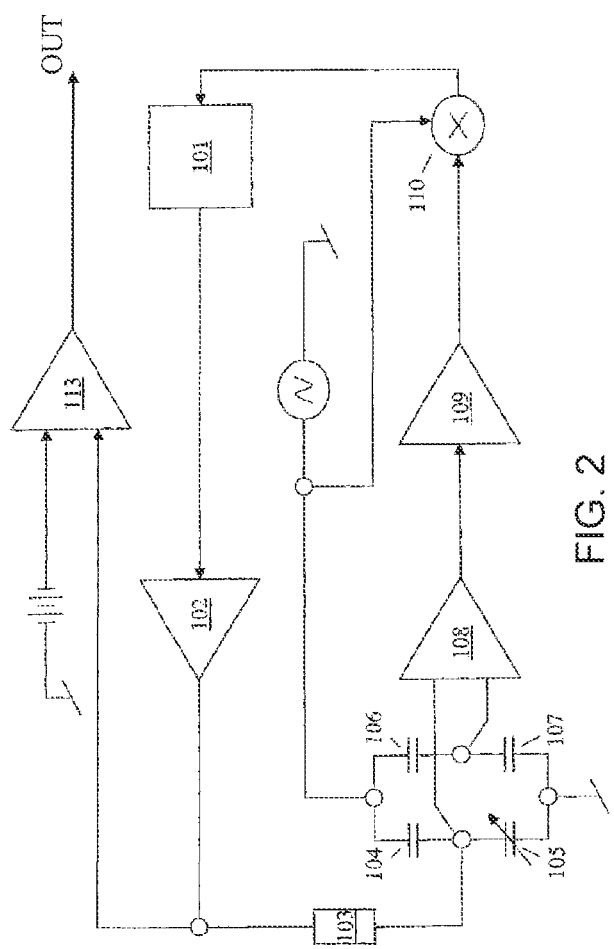
FIG. 2 shows a known feedback circuit for controlling a capacitive MEMS sensor.

A feedback-loop such as in FIG. 2 can be employed to stabilize the sensor at the corresponding capacitance.

A digital feedback-loop that replaces the analogue loop of FIG. 2 is advantageous for direct analogue to digital conversion. For example, amplifier 109 could be replaced by a comparator and phase mixer 110 could be replaced by a clocked latch. Its output could be sent to a discriminator as a direct digital signal. The analogue and continuous regulators and amplifiers 101 and 102 can be omitted, which saves power. The bias resistor 103 can be implemented digitally by a switched capacitor. Its effective resistance is then also digitally controllable.

The invention provides an improved feedback loop for controlling the capacitance of a capacitive MEMS sensor. The feedback loop can be implemented digitally.

Figure 4:
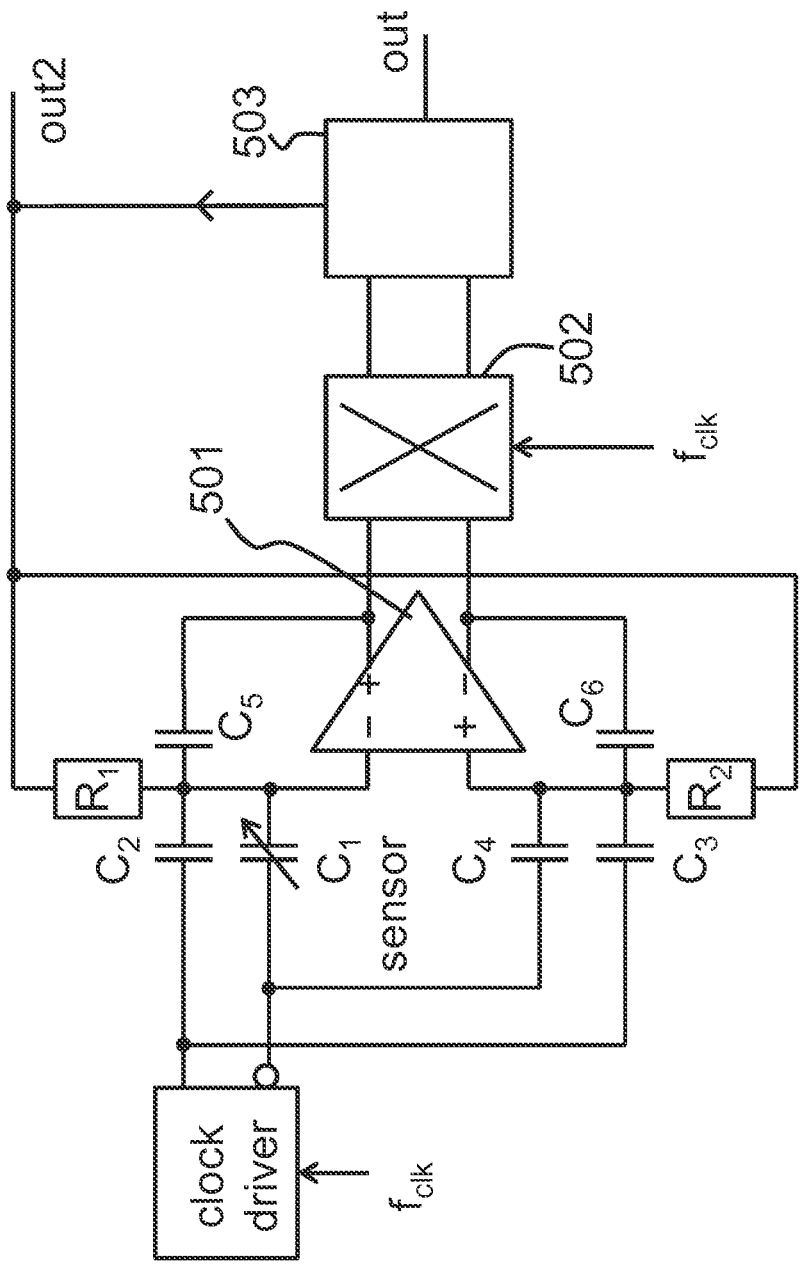
FIG. 4 shows a second example of control circuit for controlling a capacitive MEMS sensor which is differential.

An example of circuit which has been proposed by the applicant is shown in FIG. 4 in the form of a fully differential feedback circuit. This uses a differential amplifier 501 having inverting and non-inverting inputs as well as differential outputs.

The sensor capacitor C1 is compensated by a reference capacitor C2. They are connected to one input (the inverting input) of the amplifier 501. The sensor capacitor C1 is driven by a first AC signal, and the reference capacitor C2 is driven by an opposite phase second AC signal. If both capacitors have the same value, the AC voltage at the inverting input of the comparator 501 is zero.

The reference capacitor can be considered to be a clone of the sensor capacitor. At the AC modulation frequency, the capacitance of the reference capacitor C2 should be as close as possible to the nominal impedance of the sensor C1. Because the amplitudes of the AC signals are the same, and the capacitance of C2 is as close as possible to the nominal impedance of C1, but the signal sources are in anti-phase, the carrier currents through the two capacitances are in anti-phase and the carrier current through the feedback path is cancelled. This means the voltage headroom at the amplifier output can be fully used for the modulated signal, and the AC component of the sensor signal is not amplified.

Although this description relates mainly to a capacitive sensor such as a microphone, the sensor and the reference device can be resistive, capacitive, inductive, or if appropriate their switched-capacitor equivalent.

A first feedback capacitor C5 is from the non-inverted output of the amplifier to the negative input and a second feedback capacitor C6 is from the inverted output of the amplifier to the positive input. A first feedback resistor R1 is also connected to the inverting input and a second feedback resistor R2 is connected to the non-inverting input. The voltages applied to the feedback resistors provide the bias point control.

Each of the two opposite phase modulation signals connects to both amplifier inputs through a respective impedance—again shown as capacitances. One signal connects through two impedances C1,C4 to the two amplifier terminals, and the other inverse signal connects to the two amplifier terminals through two other impedances C2,C3. There can be only one sensor C1 (as shown) and the other impedances are all reference devices, or there may be multiple sensors.

This forms a completely differential implementation, with the advantage that any noise/disturbance coming from the clock supply is common-mode due to the fully differential structure.

A demodulator 502 (analogue or digital) is provided at the output of the amplifier, and for example converts the differential output to baseband for subsequent signal processing. A filter or amplifier 503 implements the feedback control and generates the signals applied to the feedback resistors R1, R2.

The two capacitances at each input are approximately equal, i.e. C1=C2 and C3=C4 (although C1 is of course variable), and preferably C1=C2≈C3=C4.

The feedback capacitors C5,C6 can be equal. They may not be needed, and they are much smaller than the sensor and reference capacitors. The desired component values relative to the mechanical resonance frequency and the clock frequency are shown in FIG. 4.

The DC bias is applied via the feedback resistors R1 and R2. For a fully digital version, R1 and R2 could each be replaced by a switched capacitor.

This circuit has a DC bias feedback loop and the AC voltage bias with the differential drive leads to a low AC common mode. Furthermore, the amplifier circuit in FIG. 4 has a fully differential AC signal path which is beneficial for noise suppression. As a result, the clock driver can operate at a constant amplitude.

Instead of adding a DC bias voltage in the feedback loop to the sensor, it is possible to use the quadratic force-voltage dependence of the sensor to rectify the AC force internally.

The AC amplitude then becomes an effective DC force bias of the sensor, although the average DC voltage on the sensor is zero.

Figure 5:
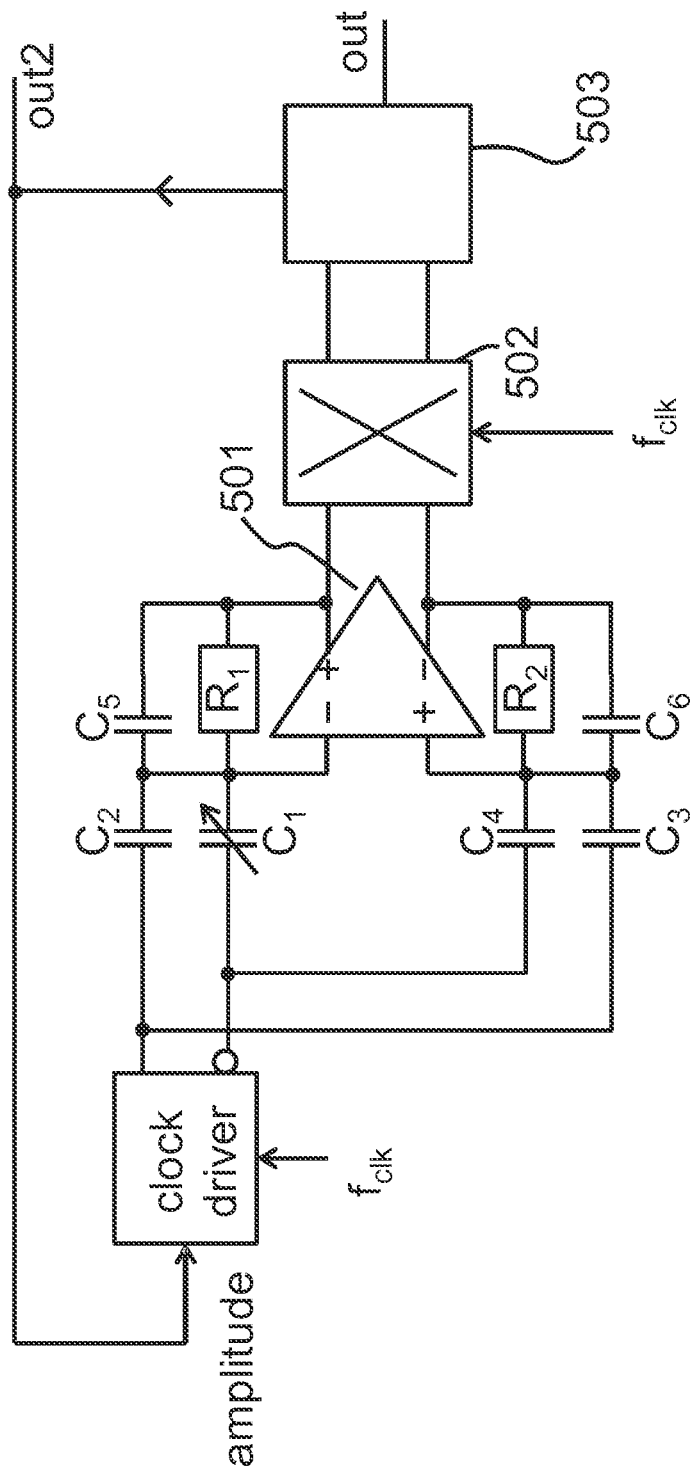
FIG. 5 shows a third example of control circuit for controlling a capacitive MEMS sensor which is differential.

This principle is shown in FIG. 5.

FIG. 5 differs to FIG. 4 in that the feedback resistors R1 and R2 are not controlled by the feedback bias control. They are in parallel with the feedback capacitors, so that each resistor and capacitor pair R1,C5 and R2,C6 forms a feedback inductance between an output of the amplifier and a respective input.

The bias control instead controls the amplitude of the AC clock signal. Thus, instead of regulating the DC voltage on the sensor, the AC amplitude is regulated. The advantage is that the amplifier can be optimized for a fixed input DC bias voltage. The output voltage (e.g. audio signal) can be obtained at the output of the filter 503 (out2) used as the feedback signal, or it can comprise a separate output (out) that would allow extra signal shaping and amplification in the filter or amplifier 503.

Again, the feedback loop can be analog or digital. This circuit enables the use of a proven AC bias amplifier.

All three circuits above regulate the sensor bias such that C1 matches C2. Thus, the bias control sets the capacitance to a desired set value, which is in the form of a previously defined fixed optimum.

The bias control can be considered to be a feedback control path. This feedback control path includes the filter or amplifier 503 and the bias elements it controls (the resistors R1,R2 in FIG. 4) or the clock driver if this is controlled (as in FIG. 5). The first feedback control path can also be considered to include the feedback elements between the amplifier outputs and inputs (C5 and C6 in FIG. 4, or C5,C6, R1 and R2 in FIG. 5).

However, biasing the sensor to a fixed capacitance does not give the optimum operation point under all operating conditions. Also production spread may need to be compensated.

The approach of the invention is to track the optimum bias point, and thereby provide tuning of this operation point.

The tuning of the operation point can be implemented once before operation. Detection of the optimum point can be made by an external test apparatus that provides a sensor stimulus, e.g. a sound signal, and then detects the output signal.

The operation point can be tuned by:
1. tuning C2 (or C3 or C4 in FIG. 5 and FIG. 6),
2 tuning the asymmetry of the AC driver voltages,
3. tuning a voltage offset in the comparator in FIG. 4.

Figure 6:
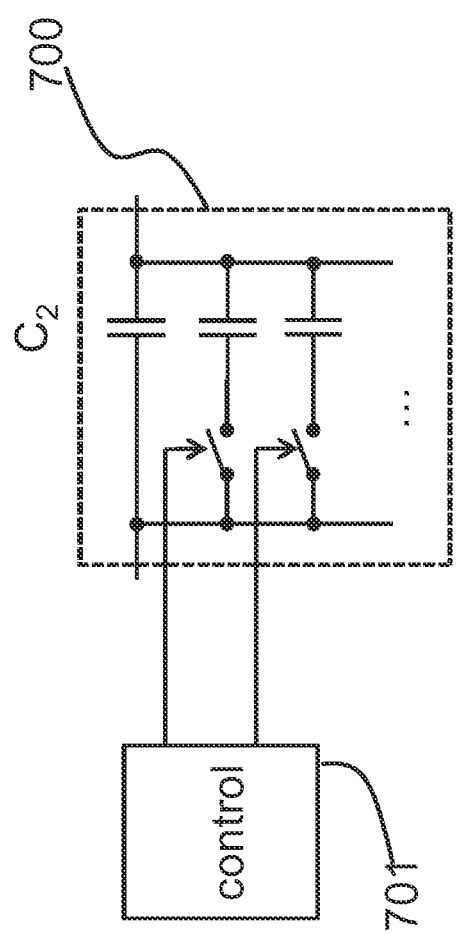
FIG. 6 shows how to implement the variable capacitor.

FIG. 6 shows an example of how to change the value of C2 by switch-enabled capacitors. As shown, capacitor C2 can be implemented as a bank 700 of capacitors in parallel and selected capacitors can be switched into the circuit under the control of a controller 701. Instead of using many switches for a fine control of the capacitance, the switching can be in larger steps, but for a fraction of the time (using dither control or pulse-width control for example).

Tuning the asymmetry of the AC driver voltages can be realized in a similar manner. For example, tuning the amplitude can be achieved by switching small charges on C1 and C2 using a switched capacitor.

A single clock cycle can be for example divided into 256 switch cycles. The amplitude could thus be controlled in 256 steps. Furthermore, it is not needed to be able to sweep the full capacitance range, but only a small range around the expected optimal capacitance. Alternatively the AC amplitudes could be controlled via linear regulators or by the supply voltage of a charge pump.

An advantage of an automatic control of the optimum bias point is that strong acoustic signals such as wind-noise do not de-sensitize the microphone at other frequencies (at least if the digital part can handle the dynamic range). Direct digital read-out is possible with improved linearity and dynamic range.

The tracking can be achieved by varying the reference bias point using a frequency below or around the resonance frequency of the membrane or backplate.

Figure 7:
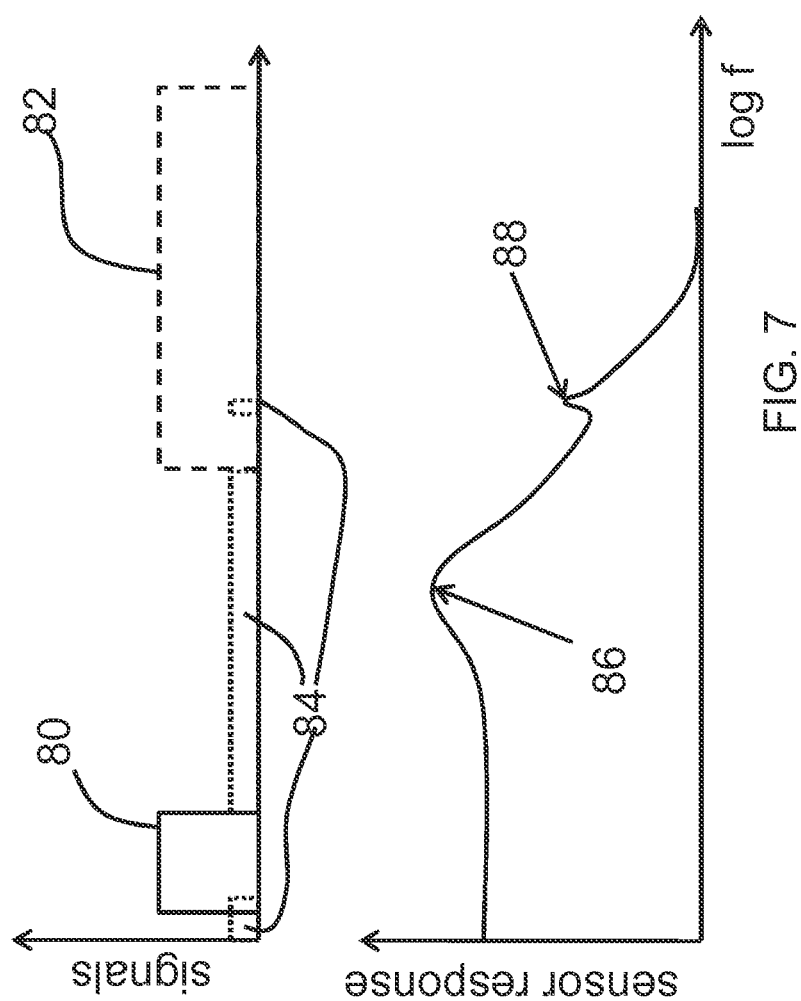
FIG. 7 shows the frequencies available for tuning of the sensor bias.

FIG. 7 shows the frequency ranges for various control loop signals. The sound signal 80 occupies a first frequency band and the (fast) feedback loop operates in a second frequency band 82. The regions 84 show potential frequency ranges for probing the optimum bias point.

The sensor response shown separately is the intrinsic response of the sensor and does not contain the influence of the feedback loop and biasing. The fundamental resonance is shown as 86 and a higher resonance is shown as 88.

The probing of the optimum bias point essentially provides an excitation signal, and the signal response to this excitation is a measure of the acoustic sensitivity of the sensor.

Figure 8:
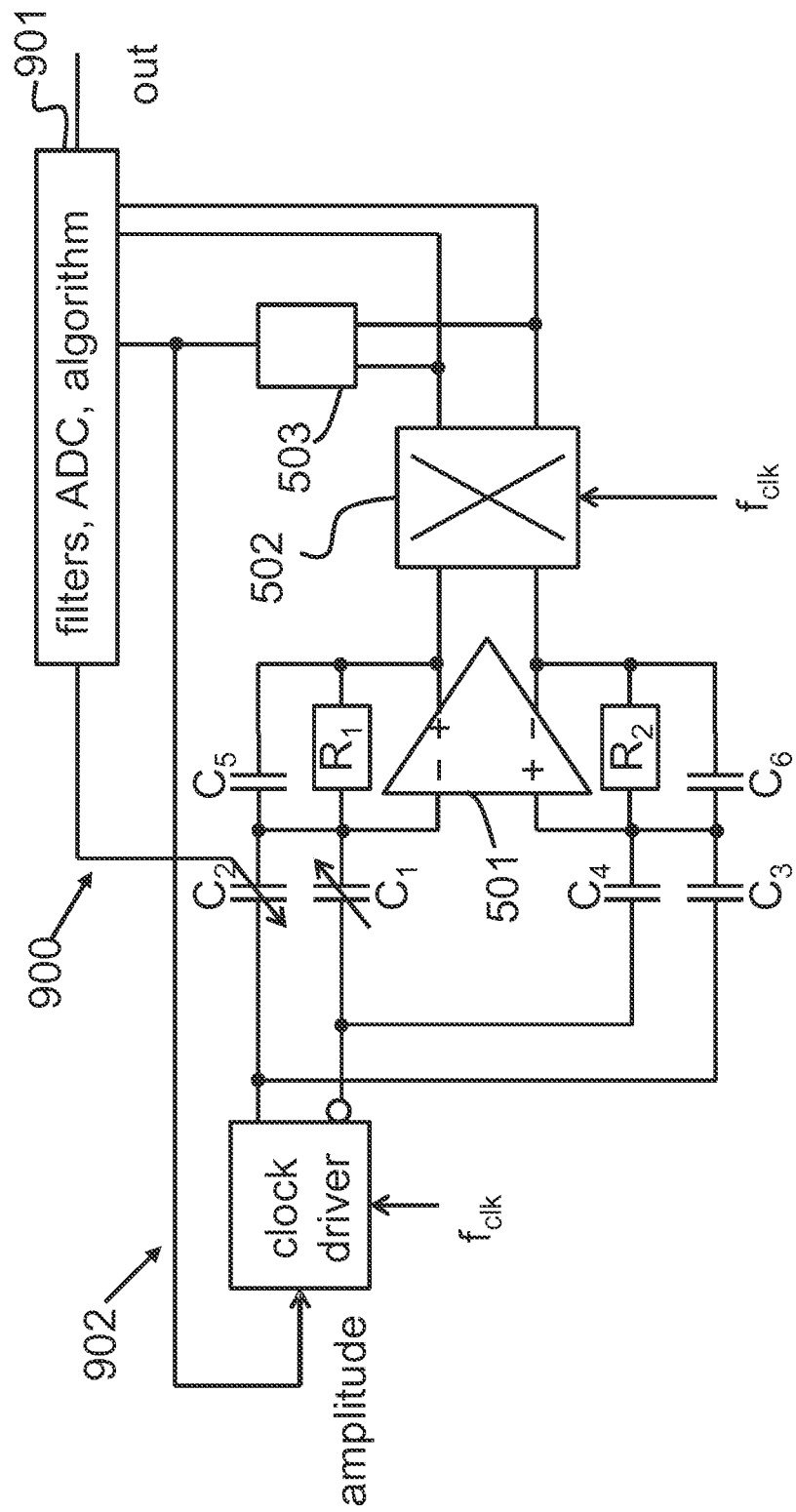
FIG. 8 shows a first example of control circuit of the invention for controlling a capacitive MEMS sensor and which is differential.

The feedback control path is discussed above. A second control loop can be constructed to set the optimum operation point as shown in FIG. 8, which is based on the principal of adjusting the AC clock signal amplitude. This second control loop can be considered to be a second feedback control path.

The circuit of FIG. 8 adds to the circuit of FIG. 5 a second feedback loop 900 between the (demodulated) output of the comparator and a controllable capacitor C2. This loop has an arrangement 901 of an ADC, digital filters and suitable control algorithm. This second feedback loop provides optimum bias control, and is a slower control than the AC bias feedback control loop 902. The fast feedback controller 503 and the optimization loop controller 901 can be combined into a single block, especially in a fully digital implementation. These elements are drawn separately to show more clearly the functionality.

When a separate controller 503 is used, the two demodulator outputs do not need to be provided to the algorithm 901. These are used if the feedback controller 503 is integrated into the control block 901.

The feedback controller 503 can essentially function as a comparator, which determines if the differential output of the amplifier 501 is positive or negative. The output is thus a stream of 1's and 0's. The signal to the clock driver is an analogue signal, and therefore requires integration of the digital comparator signal. By incorporating the function of the feedback controller 503 into the arrangement 901, a shared sigma delta converter can be used for both feedback control paths. The function of the (fast) feedback control loop 902 is essentially to ensure that on average the demodulator output is zero.

An optimization cycle can be implemented as follows.

The optimization loop 900 increases the reference capacitor C2 slightly. The fast feedback loop 902 then adjusts the AC amplitude such that the sensor capacitance C1 matches C2. In the case of a microphone, it means that the sensor membranes move closer together. If the previous reference value of C2 (the previous reference point) was below the optimum point, then the AC amplitude that is needed to reach the new reference point is higher than the old one. If the reference value of C2 was above the optimum point, then the AC amplitude is lowered. The optimum point is reached if the AC amplitude does not change any more.

A control logic 901 therefore needs to sense if the AC feedback amplitude 902 increases or decreases. In the simplest case, the control logic just sets the direction of the next optimization step.

The frequency of these optimization loop cycles must therefore be such that the sensor can mechanically respond to the stimulus, thus around a mechanical resonance frequency or below the main resonance as indicated in FIG. 7.

Additional filters can be added to tailor and stabilize the optimization loop response. One particularly useful case is that the optimization loop should just toggle between two reference points at a frequency above the audio band. It would then average over the results of the probe measurements and only would change the average reference point slowly with a maximum frequency that is below the audio band. In this way, it would compensate for drift.

The control loop could instead also overlap slightly with the audio band. In this way, it could be used to compensate for low frequency wind noise. If a fast control loop is instead used, care must then be taken to avoid noise injection into the audio band and to stabilize the loop by fine-tuning the control loop and filter.

The signal of the fast feedback loop 902 contains the audio signal. As mentioned above, the control logic can make use of the same Sigma-Delta ADC converter as for the audio signal. In fact, the fast feedback loop 902 can already implement the ADC. The control and read-out could be fully digital, but analogue signals can be used as well.

The capacitors C3 and C4 may instead be controlled by the bias control loop, or all of the reference capacitors may be controlled.

The feedback capacitors C5 and C6 are optional, and resistive only feedback may be used.

A bias control feedback loop with a probe frequency above the sound range can also be used.

Again, the bias point is slightly changed, for example by periodically switching an extra capacitor parallel to C2.

The fast AC bias feedback loop 902 then adapts the bias voltage to follow the capacitance change. If C2 is increased and the bias voltage dropped, then the actual operation point is above the optimum point. If the bias voltage increased, the operation point is below the optimum.

In the next cycle, the bias set point will then be adapted such that it approaches the optimum. In a stable situation the tracking feedback loop will then slightly oscillate around the optimum. Of course, varying C2 is not the only option for controlling the bias point. The other options mentioned above (offsets, asymmetric AC amplitudes, control of C3 and C4) could also be used.

Instead of simple stepping, the feedback loop can be more advanced with a multi-step response or coded stimuli.

The loop bandwidth of the response can be adjusted to the needs of the application. Calibration may be once, or the feedback can be used for suppression of wind-noise (<100 Hz), as also explained above.

The tracking loop could be disturbed by acoustic signals in the probe frequency spectrum, e.g. ultrasound. Therefore the spectrum can be broadened by random, coded, excitation or the high acoustic frequencies can be filtered by acoustic damping material.

If there are strong mechanical resonances, as might occur in low-noise sensors, the stability of the control and feedback-loops needs to be ensured. A digital filter in the feedback loop can be introduced to suppress strong frequency components or the clock frequency can be adapted.

Another source of instability can come from the higher order deformation modes of the sensor under high mechanical load. Since the electrostatic pressure distribution over the electrodes is not constant, but largest in the center of the membrane, it is different for the constant, uniform acoustic pressure. This leads to a ring-shaped pressure difference that can excite higher order modes. This is not an issue if the clock frequency is well above the relevant modes.

The bias generator in the feedback loop can be adapted to the needs in many ways. For high voltages, it could be constructed as charge pump. For faster charging, a feedback capacitor (such as C10) can be made switchable as shown in FIG. 6. This can be also used for automatic gain control.

The output of the AC bias feedback loop 902 is not proportional to the acoustic input pressure. This is mainly due to the quadratic dependence of the electrostatic (fed-back) pressure on the bias voltage. In reality, the quadratic shape will be distorted by field inhomogeneities and deflection profile shape changes with external pressure.

For the transfer function in the feedback loop, it is therefore best to use interpolating transfer functions with a few adjustable parameters that are derived from measurements or simulations. These can be integrated in the output filter or a following DSP. The different filters can also be used to set the desired frequency-response from mechanical signal to digital output.

The invention can be implemented as a fully digital feedback system with and digital output. Some examples enable dynamic adjustment of the optimum bias point. Automatic gain control as well as auto-calibration are also possible.

The examples above all use two AC modulation signals which are out of phase. However, this is not an essential feature.

Figure 9:
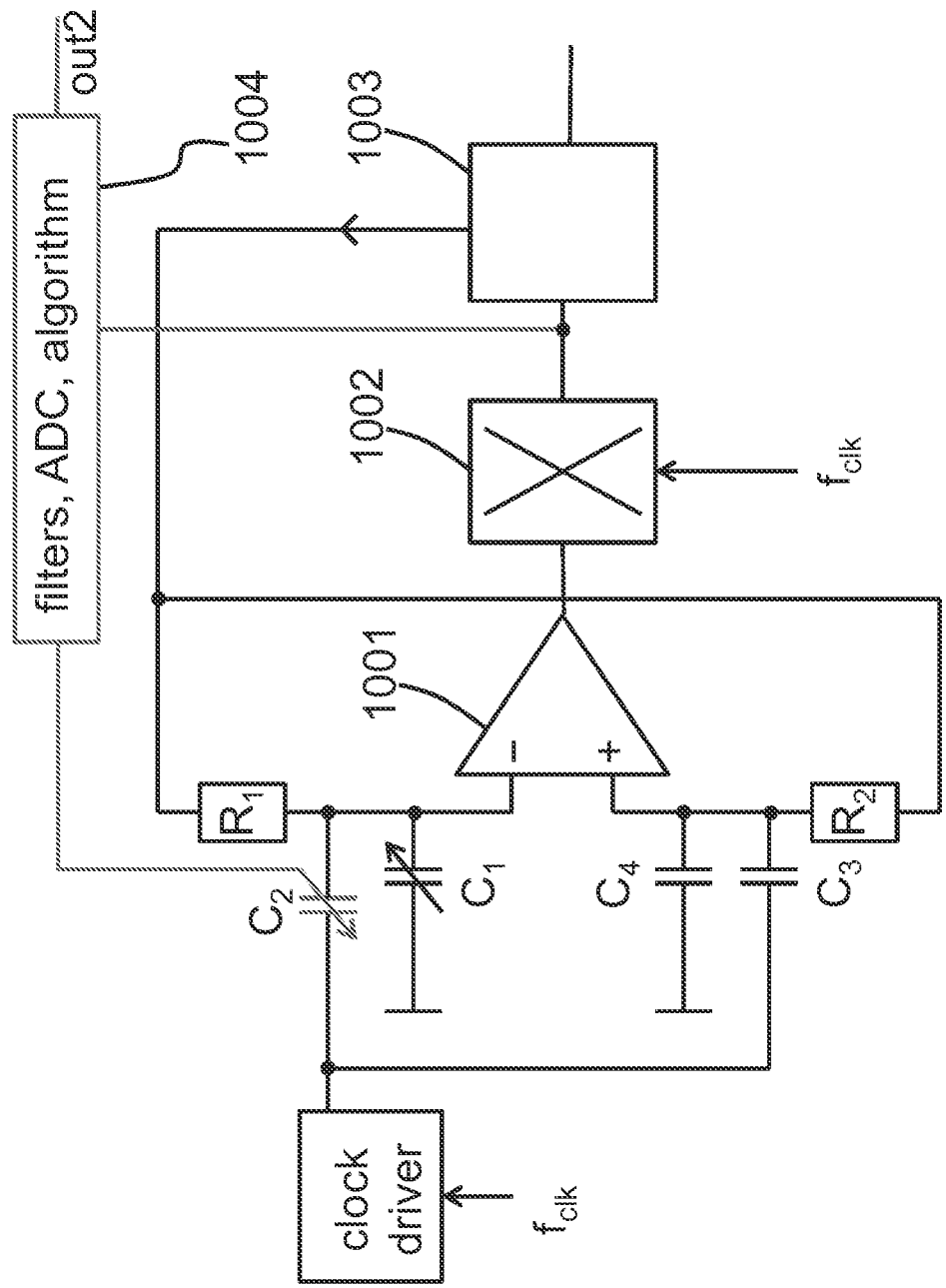
FIG. 9 shows a second example of control circuit of the invention for controlling a capacitive MEMS sensor and which is single-ended.

FIG. 9 shows the bias control feedback-loop implemented into a sensor circuit having a single modulation source and for a single-ended implementation.

The comparator 1001 has the sensor C1 and a variable reference capacitor C2 (with C1=C2) in parallel between the clock signal and the inverting input, and two reference capacitors C3=C4 in parallel between the clock signal and the non-inverting input.

A demodulator 1002 and filter/amplifier 1003 are at the output of the comparator 1001 as in the circuits of FIGS. 4, 5 and 8, and the AC bias feedback control loop provides a feedback signal to the feedback resistors R1 and R2. The additional bias control tracking loop 1004 controls the variable capacitor C2.

The use of a differential clock is preferred and allows higher AC clock signals (lower noise) with lower amplifier supply (lower power). However, the circuit of FIG. 9 is also possible particularly when using a high quality amplifier.

Figure 10:
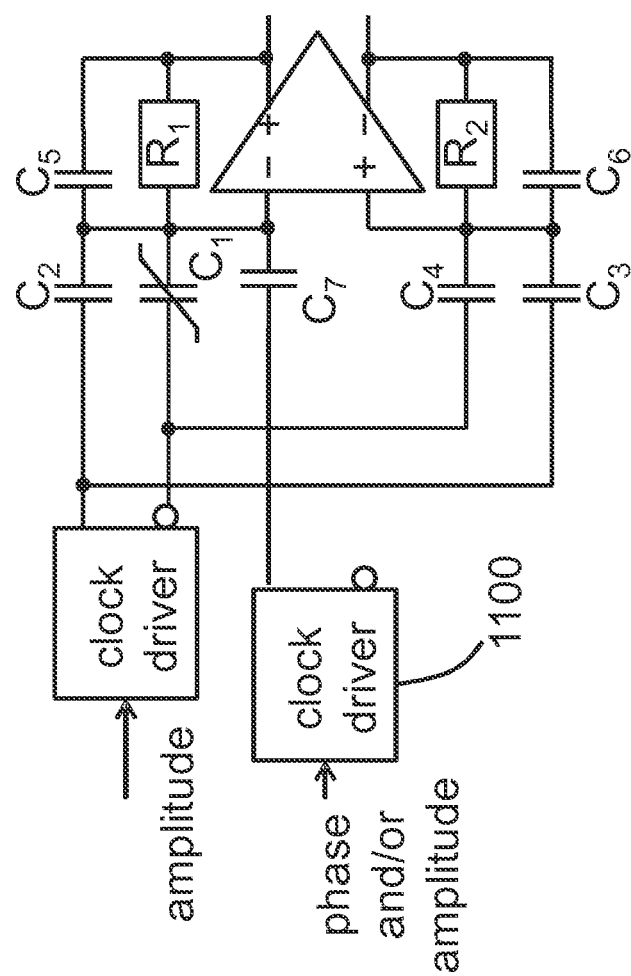
FIG. 10 shows a third example of control circuit of the invention for controlling a capacitive MEMS sensor and which is differential.

The examples above show the use of a variable capacitor in parallel with the sensor capacitor. An alternative is to provide an additional capacitor having a drive signal which is phase shifted or amplitude controlled as shown in FIG. 10.

The additional capacitor C7 is connected between a second clock driver 1100 and the inverting input to the comparator, i.e. in parallel with the sensor C1 and its reference capacitor C2. The phase and/or amplitude of the second clock driver is controlled. This defines a phase and/or amplitude shifted second capacitor network.

Some examples of the invention provide better dynamic range than with constant-charge bias. The invention can allow lower noise than a voltage amplifier and constant-charge sensor, especially at low frequencies. The power can be lower than for known feedback solutions near the instable point.

The invention can be implemented as a digital solution.

Dynamic adjustment of the optimum bias point gives less calibration effort and better immunity against wind-noise.

The dynamic adjustment means the sensor is biased such that its sensitivity is optimal. This is typically close to the pull-in voltage. The bias is applied dynamically with a feedback circuit that also enhances linearity and dynamic range. The feedback circuit can be implemented fully digitally, e.g., as a Sigma-Delta controller that allows direct conversion to a digital read-out value. The feedback is adaptable to the signal strength, e.g., to realize an automatic gain control.

The bias point can be adapted on-the-fly. The optimum can dynamically change during operation, e.g., due to non-linear effects at strong signals or temperature changes or other influences. The invention implements sensitivity sensing either by a separate electrical feedback signal above the audible range but below or near the mechanical resonance, or by analysis of the feedback signal. This provides is a way of implementing auto-correlation.

The sensitivity analysis or the feedback carrier frequency is at or near the resonance for the maximum signal.

The feedback signal is (digitally) filtered such that the feedback loop is stable. One particular concern is the stability at high sound pressures and recovery.

The sensor can comprise segmented electrodes. This can allow improved sensitivity in the center part of a MEMS membrane, a fully differential sensor or another electrode to apply the bias voltage.

A (digital) correction for non-linearity of the feedback loop and non-flatness of the frequency response can be implemented. The correction can be within the loop or as post-processing after the loop. Using digital feedback can reduce power consumption, and for the same performance it may also be possible to use less bias current and thus tolerate higher noise in the input stage than for a DC readout.

The sensor is described as a microphone capacitor. However, the sensor could be based on other inductors which vary in response to an physical input being sensed.

Various modifications will be apparent to those skilled in the art.

The invention claimed is:

1. A sensor circuit comprising:
an alternating current (AC) signal source for generating a bias signal;
an amplifier;
a sensor having an impedance which is sensitive to a physical property to be sensed, coupled between the AC signal source and the amplifier;
a tunable impedance element connected to the sensor;
a feedback loop arrangement around the amplifier for controlling a bias applied to the tunable impedance element, wherein the feedback loop arrangement comprises:
a first feedback control path for setting a bias level to a reference bias level; and
a second feedback control path for setting the reference bias level, wherein the first feedback control is faster than the second feedback control.

2. A sensor circuit as claimed in claim 1, wherein the AC signal source is a first AC signal source for generating a first bias signal, and the circuit further comprises:
a second AC signal source for generating a second bias signal with opposite phase to the first bias signal;
wherein the amplifier has first and second inputs;
wherein the sensor is coupled between one of the first and second signal sources and the first input to the amplifier;
wherein the tunable impedance element is coupled between the other of the first and second signal sources and the first input to the amplifier.

3. A circuit as claimed in claim 1, wherein the amplifier comprises an opamp.

4. A circuit as claimed in claim 1, wherein the first input comprises the inverting input of the amplifier and the first feedback control path comprises a feedback impedance from the output to the inverting input of the amplifier.

5. A circuit as claimed in claim 1, wherein the amplifier comprises a differential amplifier with an inverting input and a non-inverting input and a pair of differential outputs, wherein a second impedance element is coupled between the one of the first and second signal sources and the second input to the amplifier and a third impedance element is coupled between the other of the first and second signal sources and the second input to the amplifier.

6. A circuit as claimed in claim 5, wherein the first feedback control path comprises a first feedback impedance from one of the differential outputs to the inverting input of the amplifier and a second feedback impedance from the other of the differential outputs to the non-inverting input of the amplifier.

7. A circuit as claimed in claim 1, wherein the first feedback control path controls a bias applied to the sensor using a feedback resistor.

8. A circuit as claimed in claim 1, wherein the first feedback control path controls the AC signal source.

9. A circuit as claimed in claim 1, wherein the tunable impedance element comprises a tunable capacitor.

10. A circuit as claimed in claim 9, wherein the tunable impedance element comprises a capacitor connected to a clock driver having at least one of a tunable phase and amplitude.

11. A circuit as claimed in claim 1, wherein the second feedback control path provides the control signal for the tunable impedance element.

12. A circuit as claimed in claim 11, wherein the second feedback control path comprises an analogue to digital converter and a digital signal processing arrangement for generating a tuning signal.

13. A circuit as claimed in claim 1, wherein the first feedback control path comprises a feedback controller at the output side of the amplifier.

14. A circuit as claimed in claim 13, wherein the feedback controller is integrated into the second feedback control path.

15. A method of calibrating a sensor circuit having an alternating current (AC) signal source for generating a bias signal, an amplifier, a sensor having an impedance which is sensitive to a physical property to be sensed, coupled between the AC signal source and the amplifier and a tunable impedance element connected to the sensor,
wherein the method comprises: controlling a bias applied to the sensor using a first feedback control path for setting a bias level to a reference bias level and a second feedback control path for setting the reference bias level, wherein the first feedback control is faster than the second feedback control.

* * * * *